US005144329A

United States Patent [19]

Takeda et al.

[11] Patent Number: 5,144,329

[45] Date of Patent: Sep. 1, 1992

[54] RECORDING APPARATUS AND METHOD WHICH TAKES INTO ACCOUNT IMAGE INFORMATION BEING RECORDED

[75] Inventors: Tomoyuki Takeda, Yokohama; Takehiro Yoshida, Tokyo; Takeshi Ono, Yokohama; Makoto Kobayashi, Tama; Satoshi Wada, Kawasaki; Yasushi Ishida, Tokyo; Minoru Yokoyama, Yokohama; Akihiro Tomoda, Yokohama; Masakatsu Yamada, Yokohama; Takashi Awai, Yokohama, all of Japan

[73] Assignee: Canon Kabushiki Kaisha, Tokyo, Japan

[21] Appl. No.: 552,016

[22] Filed: Jul. 13, 1990

[30] Foreign Application Priority Data

Jul. 14, 1989 [JP] Japan .......... 1-180525
Jul. 3, 1990 [JP] Japan .......... 2-174461

[51] Int. Cl.$^5$ .......... G01D 9/00; B41J 2/325; B41J 2/01

[52] U.S. Cl. .......... 346/1.1; 346/76 PH; 346/140 R; 358/296

[58] Field of Search .......... 346/76 PH, 1.1, 140 PD; 358/296

[56] References Cited

U.S. PATENT DOCUMENTS

| | | | |
|---|---|---|---|
| 4,219,824 | 8/1980 | Asai | 346/76 PH |
| 4,456,392 | 6/1984 | Nozaki et al. | 346/76 PH |
| 4,737,860 | 4/1988 | Ono et al. | 358/298 |
| 4,875,056 | 10/1989 | Ono | 346/76 PH |
| 4,963,884 | 10/1990 | Kiguchi et al. | 346/1.1 |

FOREIGN PATENT DOCUMENTS

| | | | |
|---|---|---|---|
| 131080 | 8/1983 | Japan | 346/76 PH |
| 201686 | 11/1983 | Japan | 346/76 PH |
| 005075 | 1/1984 | Japan | 346/120 |
| 079680 | 4/1986 | Japan | 400/120 |
| 959964 | 4/1988 | Japan | 346/76 PH |

*Primary Examiner*—Benjamin R. Fuller
*Assistant Examiner*—Huan Tran
*Attorney, Agent, or Firm*—Fitzpatrick, Cella, Harper & Scinto

[57] ABSTRACT

A heat transfer recording apparatus for transferring the ink of an ink sheet to a recording medium to thereby effect the recording of images on the recording medium has ink sheet conveying means for conveying the ink sheet, recording medium conveying means for conveying the recording medium, recording means for acting on the ink sheet to effect the recording of images on the recording medium, counting means for counting the number of bits of black information of image data recorded by the recording means, and control means for controlling so as to change the recording period by the recording means in conformity with the number of the bits of black information counted by the counting means.

9 Claims, 9 Drawing Sheets

RECORDING APPARATUS AND METHOD WHICH TAKES INTO ACCOUNT IMAGE INFORMATION BEING RECORDED

BACKGROUND OF THE INVENTION

1. Field of the Invention

This invention relates to a recording apparatus such as a heat transfer recording apparatus in which for example, the ink of an ink sheet, is transferred to a recording medium to thereby record the images on the recording medium, and to a facsimile apparatus.

The term "a recording apparatus such as a heat transfer recording apparatus" covers, both a facsimile apparatus as well as apparatuses such as of an electronic typewriter, a copying apparatus and a printer apparatus.

2. Related Background Art

Description will hereinafter be made of a heat transfer printer taken as an example of the recording apparatus.

Generally, a heat transfer printer uses an ink sheet comprising base film having heat-melting (or heat-sublimating) ink applied thereto, and the ink sheet is selectively heated by a thermal head correspondingly to an image signal and the ink melted (or sublimated) is transferred to recording paper to thereby accomplish the recording of images. Generally, this ink sheet is a sheet from which the ink is completely transferred to the recording paper by a single image recording (so-called one time sheet) and therefore, it has been necessary that after the termination of the recording of one character or one line, the ink sheet be conveyed by an amount corresponding to the recorded length and then the unused portion of the ink sheet be reliably brought to a position for recording. This has led to the tendency that the quantity of ink sheet used is increased and when compared with an ordinary thermosensitive printer for recording images on thermosensitive paper, the heat transfer printer has high running costs.

In order to solve such a problem, there have been proposed heat transfer printers in which, as seen in Japanese Laid-Open Patent Application No. 57-83471, Japanese Laid-Open Patent Application No. 58-201686 and Japanese Patent Publication No. 62-58917, recording paper and an ink sheet are conveyed with a speed difference therebetween. As described in these publications, an ink sheet capable of carrying out plural (n) image, recordings (a so-called multiprint sheet) is known and such an ink sheet for reducing the running costs in a heat transfer printer. If such an ink sheet is used, when recording is to be effected continuously over a recording length L, recording can be effected with the length of the ink sheet which is conveyed after or during the recording of each image being made smaller than the length L ($L/n$:$n>1$) (this is called multiprinting). In this case, the ink of the ink layer of the ink sheet is heated n times and during each heating cycle, a shearing force is created between the melted (or sublimated) ink of the ink layer and the ink which is not melted (or sublimated) to thereby transfer the ink to the recording paper. The ink of this ink layer is easier to melt as the temperature of the ink becomes higher.

On the other hand, the heat generating element of a thermal head for heating the ink layer is electrically energized and heated when the image information of corresponding recording dots is black. As the amount of black image data to be recorded becomes greater, the time for which the heat generating element of the thermal head is electrically energized becomes longer, and heat is accumulated in the thermal head. In extreme cases, even when the thermal head is not electrically energized, part of the ink of the ink layer of the ink sheet may be melted and transferred to the recording paper, thus causing the "ground stain" of the recording paper or so-called "trail-leaving" which is a phenomenon that when shift is made to the printing of the next line, the ink recorded in the preceding line leaves a trail. This strains the recording paper, which causing deterioration of the quality of recorded images.

SUMMARY OF THE INVENTION

It is an object of the present invention to provide a recording apparatus and a facsimile apparatus which can provide clear-cut recorded images.

It is another object of the present invention to provide a recording apparatus and a facsimile apparatus which can improve the quality of recording.

It is still another object of the present invention to provide a recording apparatus and a facsimile apparatus in which undesirable heat accumulation in recording means such as a thermal head can be prevented.

It is yet still another object of the present invention to provide a recording apparatus and a facsimile apparatus in which, in view of the above-described example of the prior art, the number of black picture elements is counted and when the number of black picture elements exceeds a predetermined value, provision is made to wait for a time to radiate heat until the recording of the next line, thereby reducing the influence of the heat accumulation in a recording head.

DESCRIPTION OF THE PREFERRED EMBODIMENTS

An embodiment which will now be described as an example of a recording apparatus is a heat transfer recording apparatus, in which the black information of image data recorded by recording means which acts on an ink sheet to effect the recording of images on a recording medium is counted and the recording period by the recording means is changed correspondingly to the counted black information.

Some preferred embodiments of the present invention will hereinafter be described in detail with reference to the accompanying drawings.

Description of a Facsimile Apparatus (FIGS. 1–4)

Figure 1:
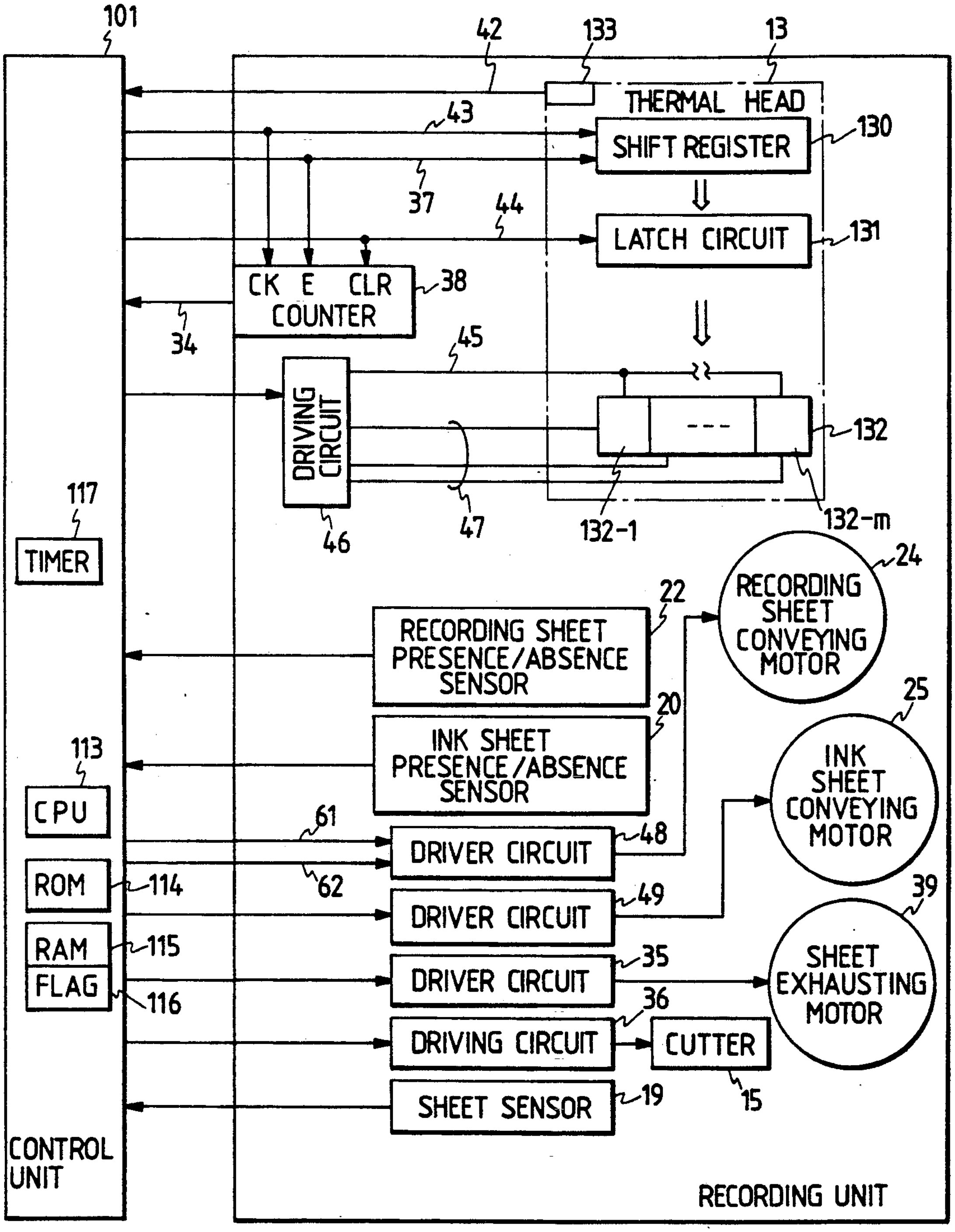
FIG. 1 shows the electrical connections between a control unit and a recording unit to which an embodiment of the present invention is applied.
Figure 2:
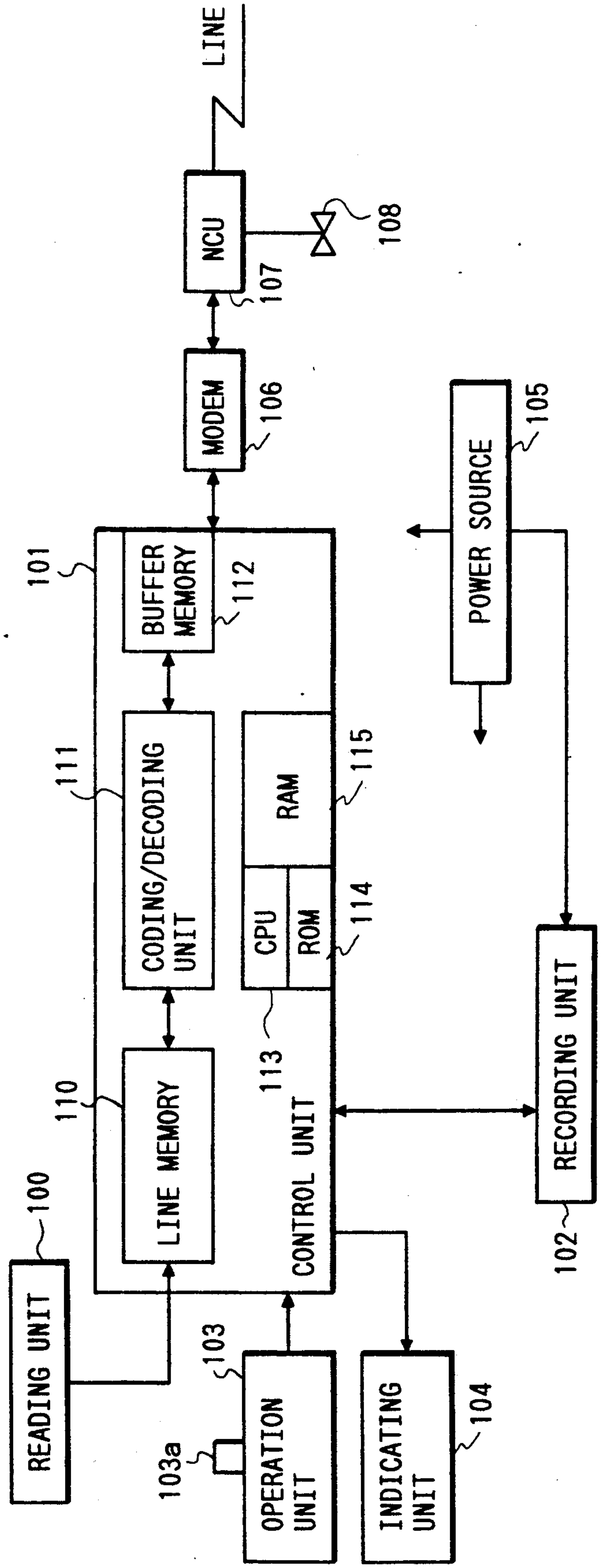
FIG. 2 is a block diagram schematically showing the construction of a facsimile apparatus to which an embodiment of the present invention is applied.
Figure 3A:
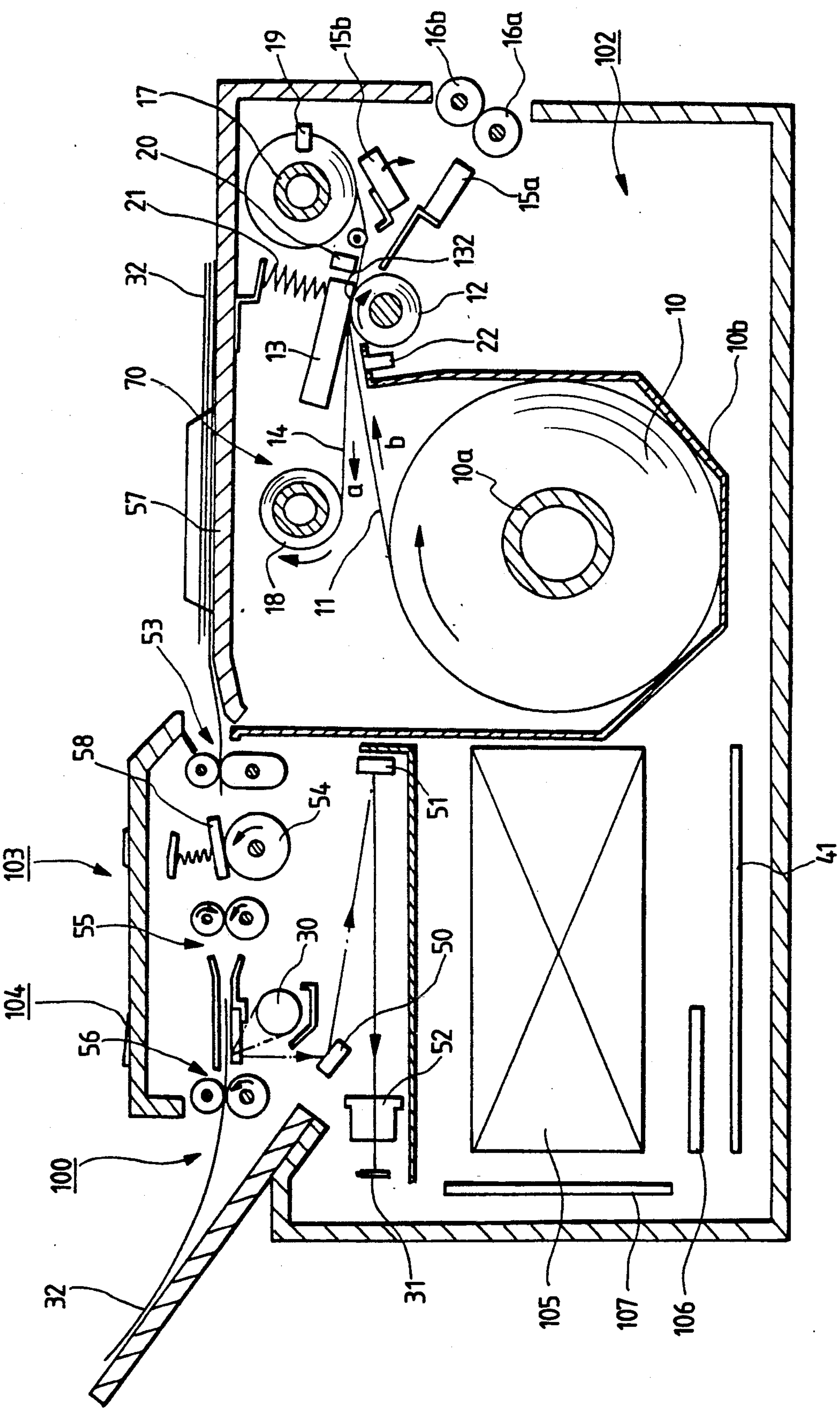
FIG. 3A is a side sectional view showing the mechanism portion of the facsimile apparatus of said embodiment.
Figure 3B:
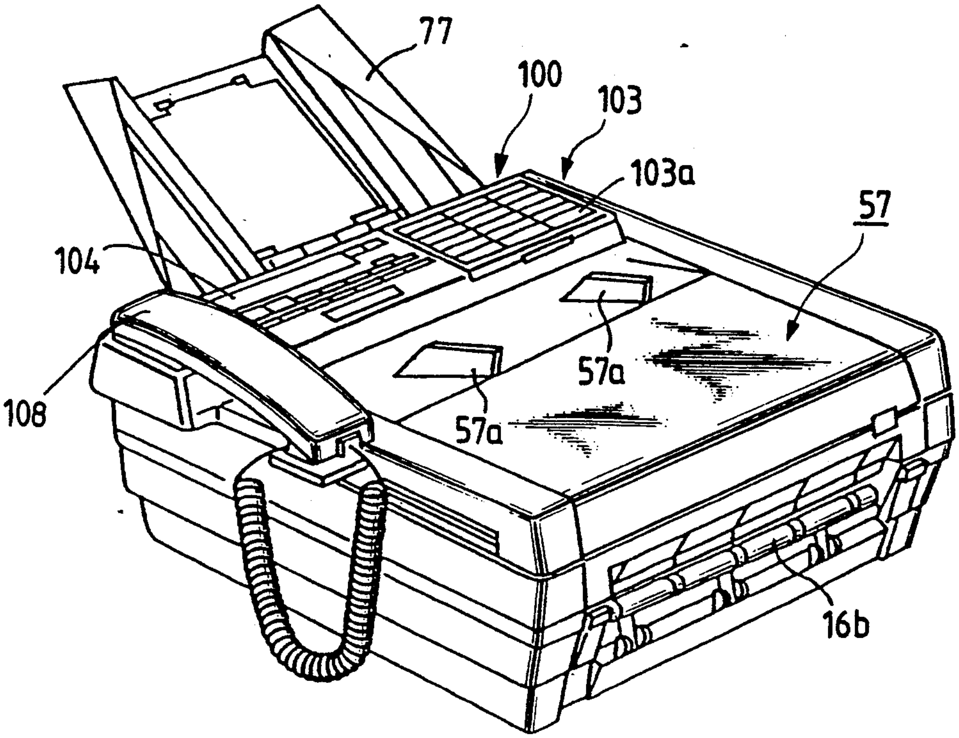
FIG. 3B is a pictorial perspective view of said embodiment.
Figure 4:
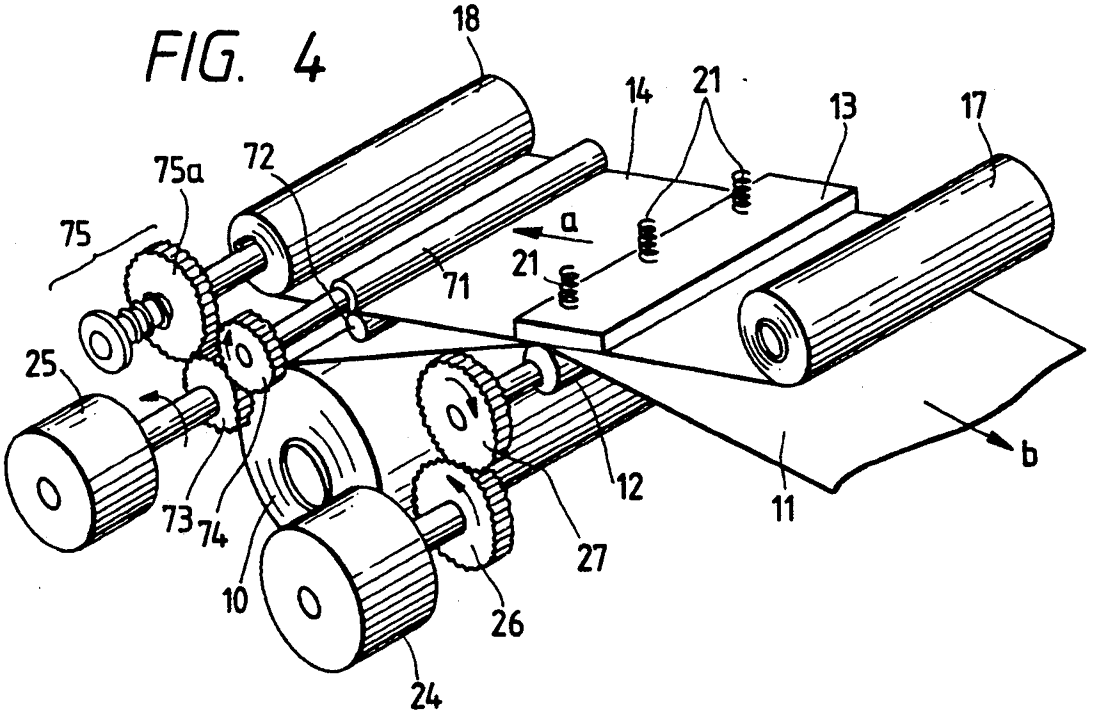
FIG. 4 shows the structure of conveying systems for an ink sheet and a recording sheet.

FIGS. 1–4 show an example in which a heat transfer printer using an embodiment of the present invention is applied to a facsimile apparatus. FIG. 1 shows the electrical connections between the control unit 101 and the recording unit 102 of the facsimile apparatus, FIG. 2 is a block diagram schematically showing the construction of the facsimile apparatus, FIG. 3A is a side sectional view of the facsimile apparatus, FIG. 3B is a pictorial perspective view of the facsimile apparatus, and FIG. 4 shows the conveying mechanisms for a recording sheet and an ink sheet.

The construction of the facsimile apparatus will first be described briefly with reference to FIG. 2.

In FIG. 2, the reference numeral 100 designates a reading unit which reads an original and outputs it as an image signal to the control unit 101. The construction of the control unit 101 will now be described. The reference numeral 110 denotes a line memory for storing therein the image data of each line of image data. In the line memory 110, image data for one line from the reading unit 100 is stored during the transmission of an original (the case of the facsimile mode) or the copying of the original (the case of the copy mode), and one line data of the decoded received image data is stored during the reception of the image data. The stored data is output to the recording unit 102, whereby image formation is effected. The reference numeral 111 designates a coding/decoding unit for coding transmitted image information as by MH coding and decoding the received coded image data and converting it into image data. The reference numeral 112 denotes a buffer memory for storing the transmitted or received coded image data therein. These portions of the control unit 101 are controlled, for example, by a CPU 113 such as a microprocessor. The control unit 101 is further provided with an ROM 114 storing the control program of the CPU 113 and various data therein, and an RAM 115 for temporarily preserving various data as the work area of the CPU 113.

The reference numeral 102 designates a recording unit which is provided with a thermal line head (having a plurality of heat generating elements over the recording width) which effects image recording on a recording sheet by the heat transfer recording method. The construction of this unit will be described later in detail with reference to FIG. 3. The reference numeral 103 denotes an operation unit including instruction keys for various functions such as the starting of transmission, etc. and telephone number input keys, and the reference character 103*a* designates a switch for indicating the kind of an ink sheet 14 used. When the switch 103*a* is ON, it indicates that a multiprint ink sheet is mounted, and when the switch 103*a* is OFF, it indicates that an ordinary ink sheet (one time ink sheet) is mounted. The reference numeral 104 denotes an indicating unit usually provided adjacent to the operation unit 103 to indicate various functions, the state of the apparatus, etc. The reference numeral 105 designates a power source unit for supplying electric power to the entire apparatus. The reference numeral 106 denotes a modem modulator-demodulator for effecting the AC-DC conversion of transmitted and received signals, the reference numeral 107 designates a net control unit (NCU) for effecting communication control between it and a line, and the reference numeral 108 denotes a telephone set provided with dial keys for telephoning.

The construction of the recording unit 102 will now be described in detail with reference to FIG. 3. In FIG. 3, portions common to those in FIG. 2 are given identical reference numerals.

In FIG. 3A, the reference numeral 10 designates a roll of recording paper 11 which is plain paper wound into the form of a roll on a core 10*a*. This roll of paper 10 is rotatably contained in the apparatus so that the recording paper 11 can be supplied to a thermal head unit 13 by the rotation of a platen roller 12 in the direction of arrow. The reference character 10*b* denotes a rolled paper loading portion in which the roll of paper 10 is removably loaded. The platen roller 12 serves to convey the recording paper 11 in the direction of arrow b and press the ink sheet 14 and the recording paper 11 between it and the heat generating member 132 of the thermal head 13. The recording paper 11 on which image recording has been effected by the heat generation of the thermal head 13 is conveyed toward discharge rollers 16 (16*a*, 16*b*) by further rotation of the platen roller 12, and is cut into a page length by the engagement of cutters 15 (15*a*, 15*b*) when image recording for one page is terminated, and is discharged.

The reference numeral 17 designates an ink sheet supply roll on which the ink sheet is wound, and the reference numeral 18 denotes an ink sheet take-up roll driven by an ink sheet conveying motor which will be described later to take up the ink sheet 14 in the direction of arrow a. The ink sheet supply roll 17 and the ink sheet take-up roll 18 are removably loaded in an ink sheet loading portion 70 within the apparatus body. The reference numeral 19 designates a sensor for detecting the remaining quantity of the ink sheet 14 and detecting the velocity of conveyance of the ink sheet 14. The reference numeral 20 denotes an ink sheet sensor for detecting the presence or absence of the ink sheet 14, and the reference numeral 21 designates a spring for urging the thermal head 13 against the platen roller with the recording paper 11 and the ink sheet 14 interposed therebetween. The reference numeral 22 denotes a recording paper sensor for detecting the presence or absence of the recording paper 11.

The construction of the reading unit 100 will now be described.

In FIG. 3A, the reference numeral 30 designates a light source for irradiating an original 32. The light reflected by the original 32 is input to a CCD sensor 31 through an optical system (mirrors 50, 51 and a lens 52) and is converted into an electrical signal. The original 32 is conveyed correspondingly to the reading speed for the original 32 by conveying rollers 53, 54, 55 and 56 driven by an original conveying motor (not shown). The reference numeral 57 denotes an original supporting table. A stock of sheets of originals 32 supported on this supporting table 57 is separated by the cooperation between the conveying roller 54 and a press-separating piece 58 while being guided by a slider 57*a*, and these sheets are conveyed to the reading unit 100 and are read thereby, whereafter they are discharged into a tray 77.

The reference numeral 41 designates a control base plate constituting the main portion of the control unit 101. Various control signals are output from this control base plate 41 to the various portions of the apparatus. The reference numeral 105 denotes a power source unit, the reference numeral 106 designates a modem base plate unit, and the reference numeral 107 denotes an NCU base plate unit.

FIG. 4 shows the details of conveying mechanisms for the ink sheet and the recording paper 11.

In FIG. 4, the reference numeral 24 designates a recording paper conveying motor for rotatively driving the platen roller 12 and conveying the recording paper 11 in the direction of arrow b opposite to the direction of arrow a. The reference numeral 25 denotes an ink sheet conveying motor for conveying the ink sheet 14 in the direction of arrow a by a capstan roller and a pinch roller 72. The reference numerals 26 and 27 designate transmission gears for transmitting the rotation of the recording paper conveying motor 24 to the platen roller 12, and the reference numerals 73 and 74 denote transmission gears for transmitting the rotation of the ink sheet conveying motor 25 to the capstan roller 71. The reference numeral 75 designates a slide clutch unit.

Here, by setting the ratio of the gears 73 and 74 so that the length of the ink sheet 14 taken up onto the take-up roll 18 by the rotation of a gear 75*a* may be greater than the length of the ink sheet conveyed by the capstan roller 71, the ink sheet 14 conveyed by the capstan roller 71 is reliably taken onto the take-up roll 18. An amount corresponding to the difference between the amount of the ink sheet 14 taken up by the take-up roll 18 and the amount of the ink sheet 14 conveyed by the capstan roller 71 is absorbed by the slide clutch unit 75. Thereby, any slack in the ink sheet 14 can be eliminated and fluctuations of the conveyance velocity (amount of conveyance) of the ink sheet 14 caused by fluctuation the take-up diameter of the take-up roll 18 can be suppressed.

FIG. 1 shows the electrical connections between the control unit 101 and the recording unit 102 in the facsimile apparatus of the present embodiment, and in FIG. 1, portions common to those in other drawings are given identical reference numerals.

The thermal head 13 is a line head, as previously described. This thermal head 13 is provided with a shift register 130 for receiving as inputs serial recording data 37 for one line from the control unit 101 and a shift clock 43 and storing them therein, a latch circuit 131 for latching the data in the shift register 130 by a latch signal 44, and a heat generating element 132 comprising heat generating resistance members corresponding to one line. The heat generating element 132 is divided into m blocks designated by 132-1 to 132-m and these blocks are driven. The reference numeral 38 designates a counter for counting the number of black data (the number of data causing the heat generating element to generate heat and the number of heat generating elements scheduled to generate heat next time) of the recording data for one line. In this counter 38, the recording data is input to an enable terminal (E), the latch signal 44 is input to a clear terminal (CLR), and the serial clock 43 synchronized with the recording data is input to a clock terminal (CK), and when the recording data 37 is "1", the rising of the clock signal 43 is counted. When the result of the counting is greater than a predetermined value, a wait signal 34 is output to the control unit 101. For example, where the original image reading width in the reading unit 100 is size B4 (2048 picture elements) and the pulse width causing the heat generating element 132 of the thermal head 13 is 600 μsec., the wait signal 34 is output to the control unit 101 when the result of said counting is 1000 or greater. The threshold value of the counter which outputs this wait signal 34 is not fixed at 1000, but may be suitably selected by the control unit 101. That is, according to the present embodiment, even when after the recording of the present line, the transfer of the data of the next line is terminated (the preparation for the recording of the next line is completed), if the number of black data exceeds a predetermined value, the recording of the next line is not effected until the waiting time has passed.

Figure 5:
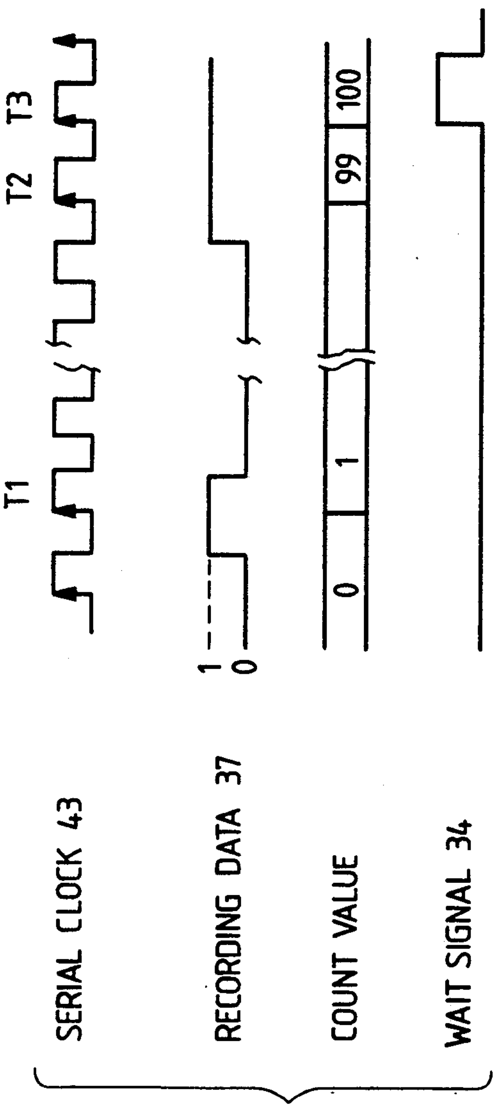
FIG. 5 shows an example of the count timing of a counter in a first embodiment.

FIG. 5 shows an example of such timing. Here, at the rising (timing T1—T3) of the clock 43 when the recording data 37 is "1" (black data heat generating data)), the counter 38 is caused to count up. When the count value by the counter 38 exceeds the predetermined value, the wait signal 34 is output.

The control unit 101 receives this wait signal 34 as an input and thereby begins the waiting operation. During this waiting operation, the control unit 101 transfers the recording data to the shift register 130 of the thermal head 13, but does not output the latch signal 44 until the waiting terminates. This waiting time is counted by a timer 117, and when the control unit 101 detects the passage of a predetermined time (in the present embodiment, for example, 5 m sec.) on the basis of the output from the timer 117, the waiting operation is terminated.

The reference numeral 133 denotes a temperature sensor mounted on the thermal head 13 for detecting the temperature of the thermal head 13. The output signal 42 of this temperature sensor 133 is A/D-converted in the control unit 101 and input to the CPU 113. Thereby the CPU 113 detects the temperature of the thermal head 13, and correspondingly to the detected temperature, it changes the pulse width of a strobe signal 47 or changes the driving voltage for the thermal head 13 output to a power source line 45, thereby effecting the control of the applied energy to the thermal head 13 conforming to the characteristic of the ink sheet 14.

The kind (characteristic) of the ink sheet 14 is indicated by the operator manually operating the switch 103*a* of the aforementioned operation unit 103. The kind or characteristic of the ink sheet 14 may be automatically discriminated by automatically detecting a mark or the like printed on the ink sheet 14. As a further alternative, the kind or characteristic of the ink sheet 14 may be automatically discriminated by automatically detecting a mark, a cut-away or a projection formed on the cartridge of the ink sheet.

The reference numeral 46 designates a driving circuit which receives as an input the driving signal for the thermal head 13 from the control unit 101 and outputs the strobe signal 47 for driving the thermal head 13 at each block unit. This driving circuit 46 can change the voltage output to the power source line 45 for supplying an electric current to the heat generating element 132 of the thermal head 13 by the instructions of the control unit 101 to thereby change the applied energy to the thermal head 13. The reference numeral 36 denotes a driving circuit for bringing the cutters 15 into meshing engagement with each other to thereby drive the cutters. The driving circuit 36 includes a cutter driving motor, etc. The reference numeral 39 designates a sheet discharge motor for rotatively driving the paper discharge rollers 16. The reference numerals 35, 48 and 49 denote driver circuits for rotatively driving the sheet discharge motor 39, the recording sheet conveying motor 24 and the ink sheet conveying motor 25, respectively. A signal 61 input to the driver circuit 48 among these driver circuits is a control signal for controlling the driving current for the recording sheet conveying motor 24, and the reference numeral 62 designates an energization phase signal for changing over the energization phase of the recording sheet conveying motor 24. In the present embodiment, the sheet discharge motor 39, the recording sheet conveying motor 24 and the ink sheet conveying motor 25 are stepping motors, but this is not restrictive, and these motors may be, for example, DC motors.

Description of the Recording Operation (FIGS. 1–6)

Figure 6:
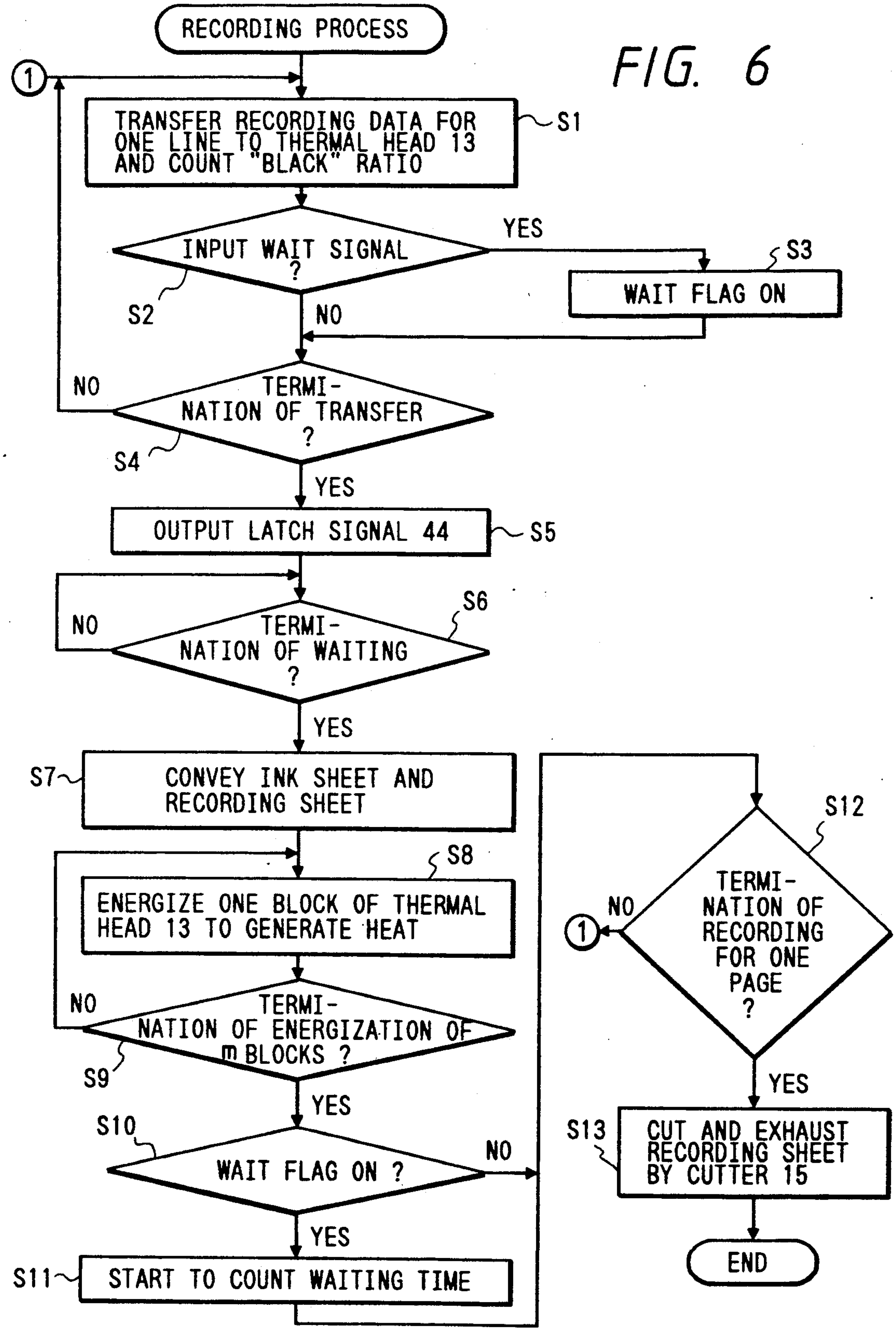
FIG. 6 is a flow chart showing the recording process in the first embodiment.

FIG. 6 is a flow chart showing the recording process for one page in the facsimile apparatus of this embodiment, and the control program for executing this process is stored in the ROM 114 of the control unit 101.

It is to be understood that this process is started by image data for one line being stored in the line memory 110 and a state ready to start the recording operation being brought about and that the mounting of the multiink sheet 14 is discriminated in the control unit 101 by the switch 103*a* or the like.

First, at a step S1, the recording data for one line is serially output to the shift register 130. At this time, the counter 38 is counting the bit numbers which are "1" (black) among the serial data for one line. Advance is then made to a step S2, where whether the wait signal 34 is input from the counter 38 is examined. When the wait signal 38 is input, advance is made to a step S3, where the wait flag 116 of the RAM 115 is rendered ON, and advance is made to a step S4. If at the step S2, the wait signal 34 is not input, advance is made to a step S4, where whether the image data for one line has been transferred to the shift register 130 of the thermal head 13 is examined, and if the transfer is not terminated, return is made to the step S1.

When at the step S4, the transfer of the image data to the thermal head is terminated, advance is made to a step S5, where the latch signal 44 is output, and the recording data for one line is stored in the latch circuit 131. At the same time, the counter 38 is cleared by this latch signal 44. Subsequently, at a step S6, whether the waiting operation is going on is examined, and if the waiting operation is going on, at step S6, waiting continues until the termination of the counting of the waiting time is reported by the timer 117.

When the waiting operation is terminated, advance is made to a step S7, where the ink sheet conveying motor 25 is driven to convey the ink sheet 14 by an amount corresponding to 1/n line. Also, at the step S7, the recording sheet conveying motor 24 is driven to convey the recording sheet 11 by an amount corresponding to one line. The length of one line is set to about 1/15.4 mm in the facsimile apparatus, but the amounts of conveyance of the recording sheet 11 and the ink sheet 14 can be set by changing the energization pulse numbers of the recording sheet conveying motor 24 and the ink sheet conveying motor 25, respectively.

Subsequently, at a step S8, one block of the heat generating resistance member 132 is electrically energized to effect the recording of an image, and at a step S9, whether the electrical energization of all blocks (m blocks) of the thermal head 13 has been terminated is examined. If at the step S9, the electrical energization of all blocks of the thermal head 13 is not terminated, return is made to the step S8, and after the passage of the energization time (about 600 μs), the electrical energization of the next block is executed. In this embodiment, the thermal head 13 is divided into four blocks and these blocks are electrically energized, and the time required for the recording of one line is approximately 2.5 ms.

If at the step S9, the electrical energization of all blocks of the thermal head 13 is terminated and the recording of one line is terminated, advance is made to a step S10, where it is determined whether the wait flag 116 is ON, that is, whether the number of black picture elements of the image data for the recorded one line has been a predetermined value or greater. If the wait flag 116 is not ON, advance is made to a step S12, but if the wait flag 116 is ON, advance is made to a step S11, where the counting of the waiting time (a predetermined time) is started by the timer 117, and advance is made to the step S12. The termination of the counting by the timer 117 is checked at the step S6 during the recording of the next line.

At the step S12, whether the image recording for one page has been terminated is examined, and if the image recording for one page is not terminated, return is made to the step S1, where as previously described, the image data for the next one line to be recorded is transferred to the thermal head 13 and the aforedescribed recording process is executed.

Next, when at the step S12, the image recording for one page is terminated, advance is made to a step S13, and the recording sheet 11 is conveyed by a predetermined amount toward the paper discharge rollers 16*a*, 16*b*. Then, the movable cutter 15*b* is driven into meshing engagement with the fixed cutter 15*a* to thereby cut the recording sheet 11 into a page length. Subsequently, the recording sheet conveying motor 24 is reversely driven to return the recording sheet 11 by a distance corresponding to the spacing between the thermal head 13 and the cutters 15, and the cutting of the recording sheet 11 is executed.

Thus, according to the present embodiment, the number of black data recorded for each line is counted and when that number is greater than a predetermined value, after the recording of the current line, a waiting period passes before the next recording is started, whereby the influence of the heat accumulation in the thermal head 13 can be reduced.

Figure 8:
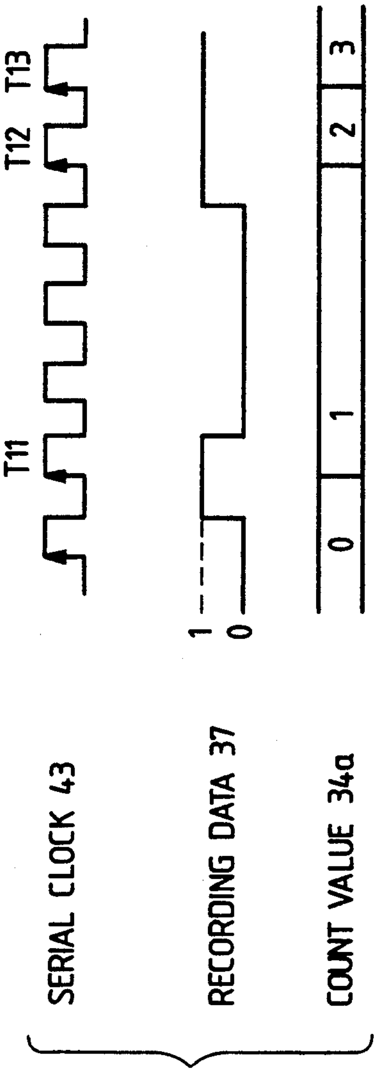
FIG. 8 shows an example of the count timing of a counter in the second embodiment.
Figure 7:
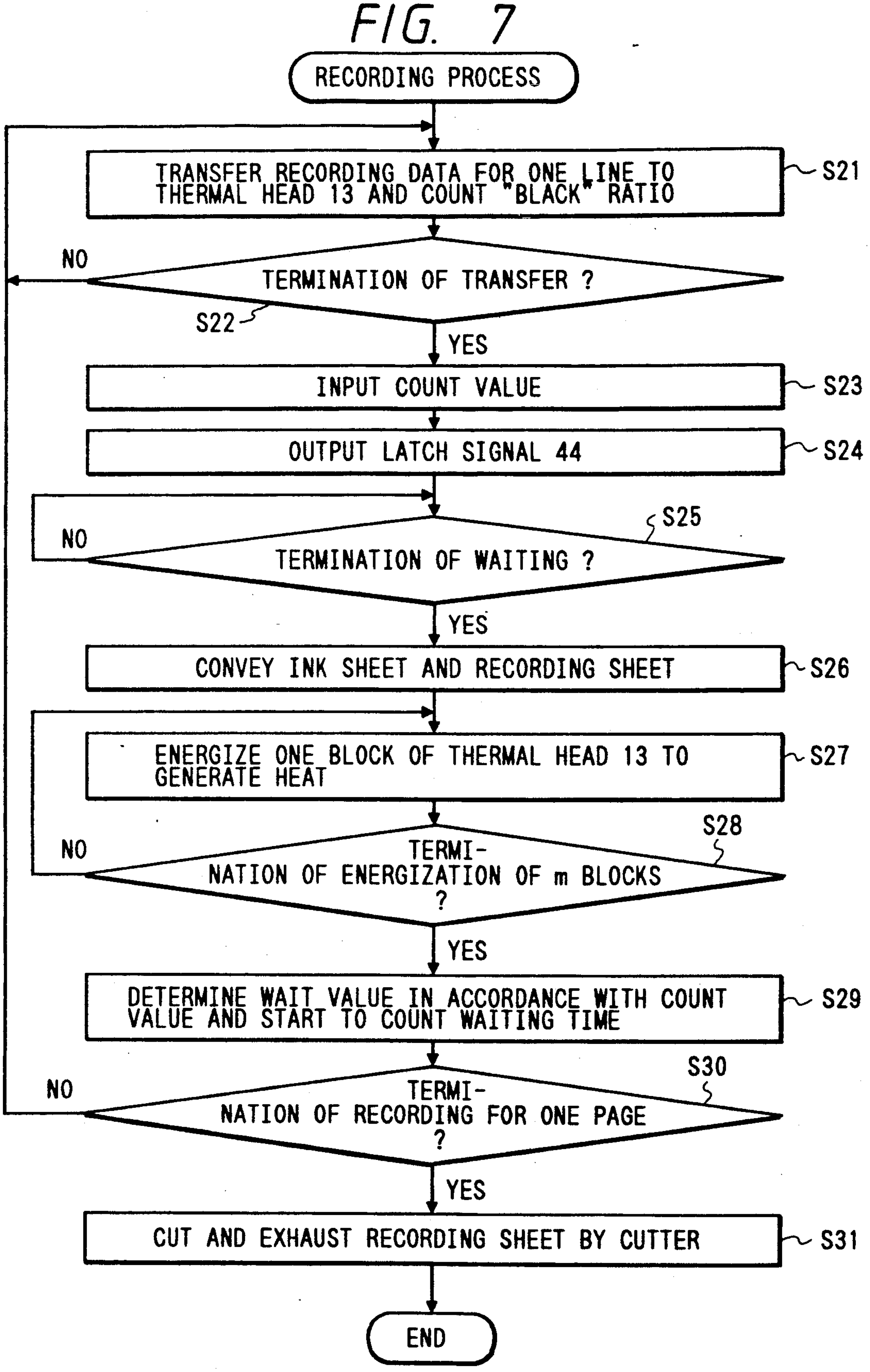
FIG. 7 is a flow chart showing the recording process in a second embodiment.

Description of Another Embodiment (FIGS. 7 and 8)

In the previously described embodiment, the waiting operation begins when the number of black picture elements in one line has reached a predetermined value or greater, and description will now be made of a case where a table for determining the waiting time in conformity with the number of black picture elements is prepared and the waiting time is changed in conformity with the number of black picture elements.

Figure 11:
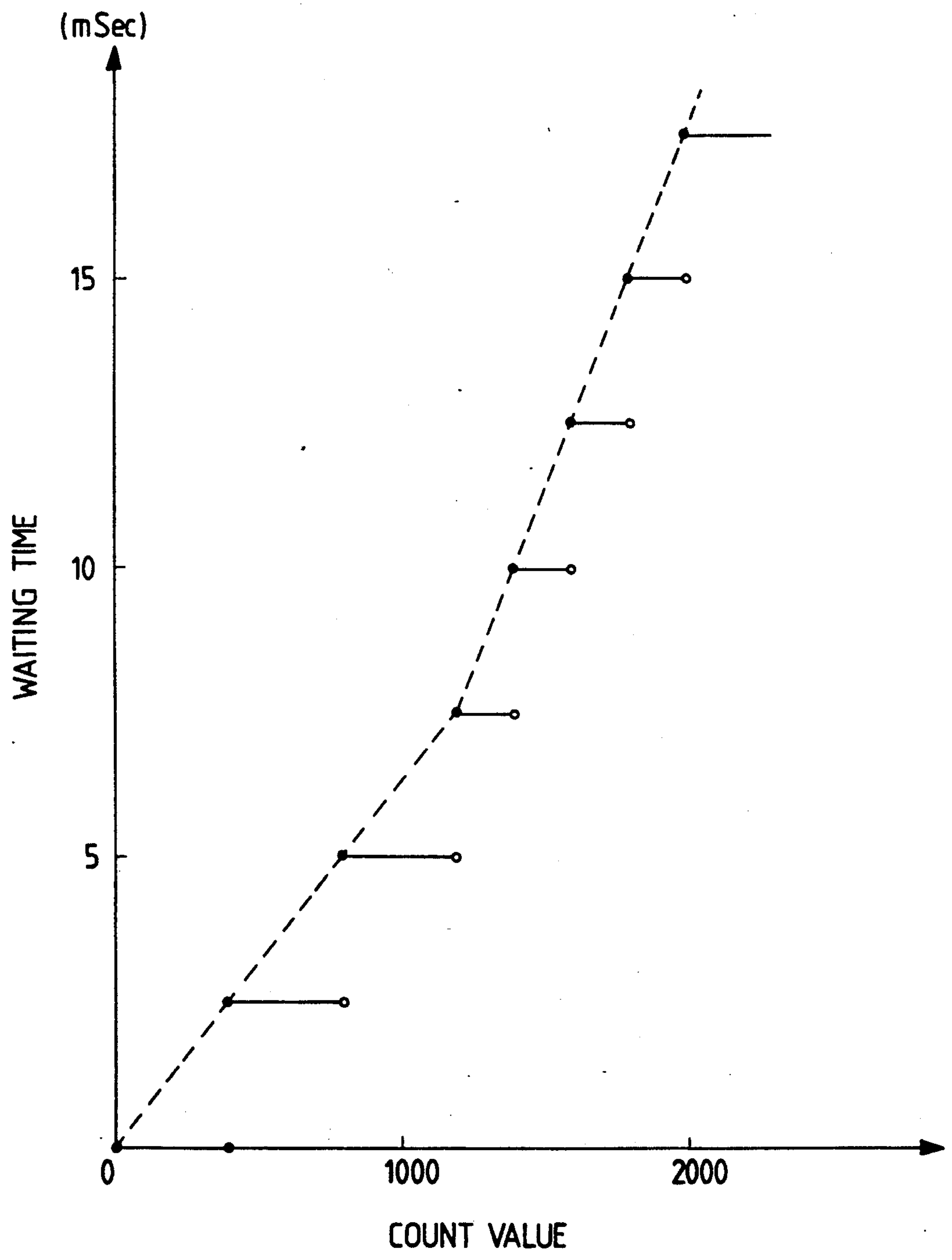
FIG. 11 is a table showing the relation between a count value indicative of the number of black picture elements and the waiting time.

First, FIG. 11 is a table showing the relation between the count value indicative of the number of black picture elements and the waiting time, and this table is stored in the RAM 115. In this table, the waiting time becomes so longer as the count value becomes greater. For example, the waiting time when the count value is 1000 is 5 msec.

FIG. 7 is a flow chart illustrating such another embodiment.

Description will be made only of the differences of this flow chart from the flow chart of FIG. 6. First, at a step S23, the count value 34*a* from the counter 38 is input to and stored in the RAM 115. When the recording for one line is terminated, advance is made to a step S29, where the waiting time conforming to the count value is determined using the table shown in FIG. 11 and which is read at the step S23 and stored in the RAM 115. This time is then set in the timer 117, and the time counting by the timer 117 is started. The termination of this time counting by the timer 117 is checked at a step S25 during the recording of the next line, and at the step S25, waiting continues until the time counting by the timer 117 is terminated.

FIG. 8 shows the time counting by the counter 38, and as in the case of FIG. 5, when the recording data 37 is "1", counting up is done at the rising of the clock 43.

In this embodiment, the number of black dots in the recording data in one line is counted by the counter 38, although this is not restrictive, and counting may be effected by software.

As described above, according to this embodiment, the waiting time conforming to the number of black picture elements in one line (the amount of heat accumulated in the thermal head) is set from after the recording of the current line until the recording of the next line and therefore, a heat radiation time corresponding to the amount of accumulated heat can be provided. Thereby, the influence of the heat accumulation in the thermal head can be reduced and the ground stain of the recording sheet and the adherence of the ink sheet to the recording sheet can be reduced.

Figure 9:
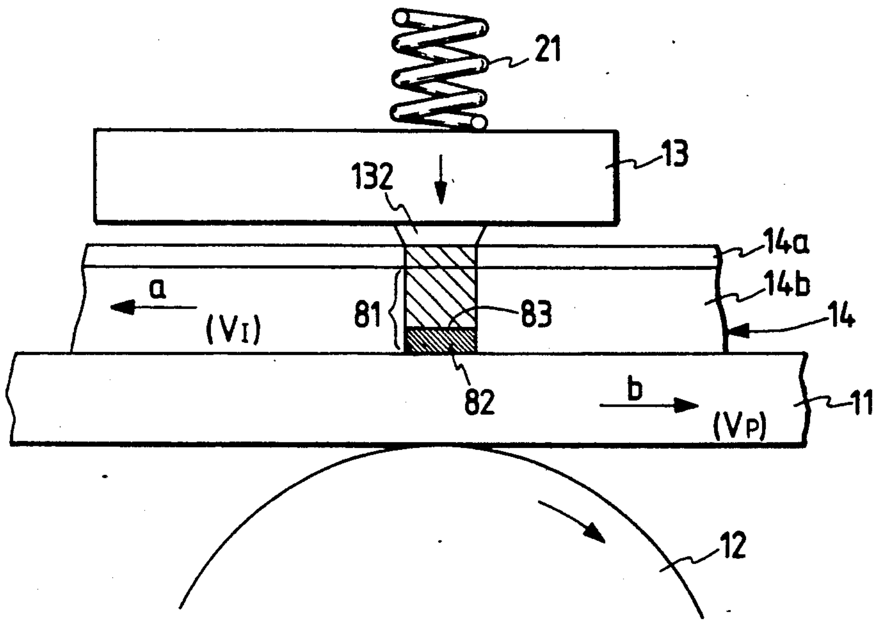
FIG. 9 shows the states of a recording sheet and an ink sheet during recording in this embodiment.

Description of the Principle of Recording (FIG. 9)

FIG. 9 shows the image recording condition when image recording is effected with the recording sheet 11 and the ink sheet 14 being conveyed in opposite directions.

As shown, the recording sheet 11 and the ink sheet 14 are nipped between the platen roller 12 and the thermal head 13. The thermal head 13 is urged against the platen roller 12 by the spring 21 with a predetermined pressure. Here, the recording sheet 11 is conveyed at a velocity Vp in the direction of arrow b by the rotation of the platen roller 12. On the other hand, the ink sheet 14 is conveyed at a velocity $V_I$ in the direction of arrow a by the rotation of the ink sheet conveying motor 25.

When the heat generating resistance member 132 of the thermal head 13 is electrically energized and heated by the power source 105, that portion of the ink sheet 14 which is indicated by hatching 91 is heated. Here, the 14*a* designates the base film of the ink sheet 14, and the 14*b* denotes the ink layer of the ink sheet 4. The ink of the ink layer 91 heated by the heat generating resistance member 132 being electrically energized is melted, and the portion thereof designated by 92 is transferred to the recording sheet 11. This transferred ink layer portion 92 corresponds to approximately 1/n of the ink layer designated by 91.

During this transfer, it is necessary that a shearing force be applied along the border line 93 of the ink layer 14*b*, so that only the portion designated by 92 will be transferred to the recording sheet 11. However, this shearing force differs depending on the temperature of the ink layer, and the shearing force tends to become smaller as the temperature of the ink layer becomes higher. So, if the heating time for the ink sheet 14 is shortened, the shearing force in the ink layer will become greater. Thus, if the relative velocity of the ink sheet 14 and the recording sheet 11 is increased, the ink layer to be transferred can be reliably peeled off from the ink sheet 14.

Figure 10:
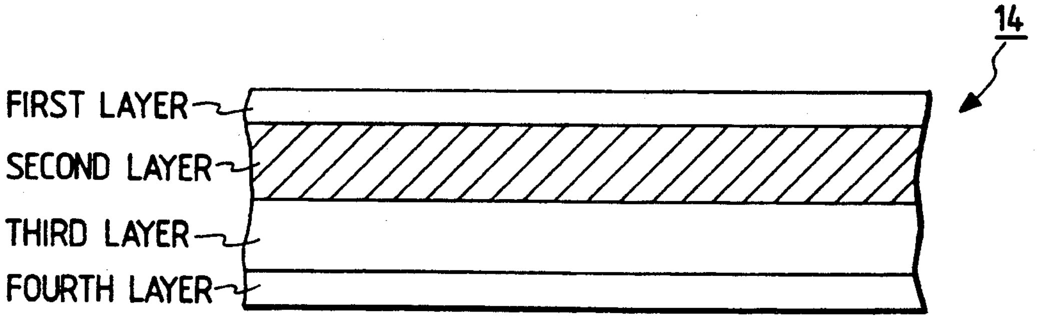
FIG. 10 is a cross-sectional view of a multilayer ink sheet used in this embodiment.

Description of the Ink Sheet (FIG. 10)

FIG. 10 is a cross-sectional view of the ink sheet used in the multiprinting in the previously described embodiment, and in this figure, the ink sheet is formed with four layers.

The second layer is the base film which provides a back-up member for the ink sheet 14. In the case of multiprinting, heat energy is applied to the same portion of the ink sheet many times and therefore, the base film may advantageously be aromatic polyamide film of high heat resisting property or condenser paper, but conventional polyester film will also stand use. The smallest possible thickness of this film is advantageous in the quality of print from its role as a medium, but a thickness of 3–8 μm is desirable from the viewpoint of strength.

The third layer is an ink layer containing an amount of ink transferrable n times to the recording sheet. The main components of this layer are resin such as EVA as an adhesive agent, carbon black or nigrosine dye for coloring, and carnauba wax or paraffin wax as a binding material, and these are combined so as to be usable n times in one and the same portion. The amount of application of these materials may desirably be 4–8 $g/m^2$, but sensitivity and concentration differ depending on the amount of application, and the amount of application can be chosen as desired.

The fourth layer is a top coating layer which is not concerned with printing, but rather prevents the ink of the third layer from being pressure-transferred. The fourth layer is formed of transparent wax or the like. Thus, it is only the transparent layer that is pressure-transferred, and the ground stain of the recording sheet can be prevented. The first layer is a heat resisting coat layer for protecting the second layer, i.e., the base film, from the heat of the thermal head. This is suitable for multiprinting in which heat energy corresponding to n lines may be applied repeatedly to and the same portion of the ink sheet (when black information is continuous), but whether it should be used or not is optional. Also, this layer is effective for base film of relatively low heat resisting property such as polyester film.

The construction of the ink sheet 14 is not restricted to this embodiment, but the ink sheet may be, for example, one comprising a base layer and a porous ink retaining layer provided on one side of the base layer and containing ink therein. As a further alternative, the ink sheet may be one comprising base film and an ink layer of heat resisting property having fine porous net-like structure and provided on the base film, the ink layer containing ink therein. The material of the base film may be film formed, for example, of polyamide, polyethylene, polyester, polyvinyl chloride, triacetyl cellulose, nylon or the like, or paper. Further, the heat resisting coat layer is not always necessary, but the material thereof may be, for example, silicone resin, epoxy resin, fluorine resin, etholocellulose or the like.

As an example of the ink sheet having heat-sublimating ink, mention may be made of an ink sheet comprising a substrate formed of polyethylene terephthalate, polyethylene naphthalate, aromatic polyamide film or the like, and a color material layer provided on the substrate and containing spacer particles formed of guanamine resin and fluorine resin and a dyestuff.

The heating system in the heat transfer printer is not limited to the thermal head system using the aforedescribed thermal head, but may also be, for example, the electrical energization system or the laser transfer system.

Further, in the previously described embodiment, the present invention has been described with respect to a case where it is applied to a facsimile apparatus as a heat transfer printer, whereas this is not restrictive, but the present invention can also be applied, for example, to a word processor, a typewriter, a copying apparatus or the like.

The recording medium is not limited to recording paper, but may be, for example, cloth or plastic sheet to which ink can be transferred. Also, the ink sheet is not restricted to the roll construction shown in the embodiments, but may also be, for example, the so-called ink sheet cassette type or the like in which an ink sheet is contained within a housing removably mountable in a recording apparatus body and this housing can be mounted or dismounted with respect to the recording apparatus body.

Furthermore, in the above-described embodiments, a thermal head has been described as an example of the recording means, but the present invention is not restricted thereto. For example, an ink jet head for discharging ink to thereby effect recording on a recording medium may be applied as the recording means. Such an ink jet head is generally provided with minute liquid discharge ports (orifices), a liquid flow path, an energy-acting portion provided in a portion of the liquid flow path, and energy generating means for generating liquid droplet forming energy caused to act on the liquid in said energy-acting portion. As the energy generating means for generating such energy, mention may be made of energy generating means in which an electromagnetic wave such as laser is applied and absorbed into liquid to generate heat and the liquid is carefully expelled by the action of the generated heat, or energy generating means in which liquid is heated by an electro-thermal conversion member and is discharged. Among these, a bubble jet head in which a driving signal for providing a rapid temperature rise exceeding nuclear boiling is applied to the electro-thermal conversion member to thereby generate heat energy in the electro-thermal conversion member and film boiling is caused on the heat-acting surface of the head to form a bubble in ink and by the growth of this bubble, the ink is discharged through discharge ports permits discharge ports to be arranged at a high density and therefore is particularly effective to accomplish recording of high resolving power.

As described above, according to the present embodiment, when the number of recording dots for one line is great and the amount of heat accumulated in the thermal head becomes great, a time for the heat radiation of the thermal head is provided between the recording of the current line and the start of the recording of the next line, whereby the ground stain and trail-leaving of the recording sheet can be prevented. Thus, according to the present embodiment, the number of black picture elements is counted and when that number exceed a predetermined value, there is provided a time for permitting heat radiation until the recording of the next line, whereby the influence of the accumulated heat in the recording head can be reduced.

As described above in detail, according to the present invention, the influence of the accumulated heat can be reduced to thereby improve the quality of recorded images.

What is claimed is:

1. A recording apparatus for recording an image on a recording medium, comprising:

a head member having a number of heat generating elements for recording;

conveying means for conveying said recording medium;

discriminating means for discriminating a ratio of a quantity of said heat generating elements to be driven by a recording signal for a predetermined line to the number of said heat generating elements; and changing means for changing a time interval between recording of said predetermined line and recording of a previous line according to the ratio discriminated by said discriminating means.

2. An apparatus according to claim 1, wherein said apparatus is a facsimile apparatus further comprising transmitting and receiving means for transferring information read from an original and converting that information into the recording signal.

3. An apparatus according to claim 1, wherein said apparatus is an ink jet recording apparatus and said head member is an ink jet recording head for discharging an ink by utilizing thermal energy applied by driving said heat generating elements.

4. A thermal recording apparatus for recording an image on a recording medium, comprising:

a line type thermal recording head having a plurality of heat generating elements disposed across a direction of motion of said recording medium and for recording across a width of said recording medium relative to the direction of motion of said recording medium;

an ink sheet having an ink width corresponding to the width of said recording medium;

moving means for moving said recording medium in a first direction and said ink sheet in a second direction, said first and said second directions being opposed to each other at an area where said recording head is located;

measuring means for measuring a driving ratio of said heat generating elements which are for one line driven by recording information applied to said thermal recording head; and changing means for changing a time interval between a recording of two consecutive lines in accordance with the ratio measured by said measuring means.

5. An apparatus according to claim 4, wherein said apparatus is a facsimile apparatus and further comprises transmitting and receiving means for transferring information read from an original and converting the read information into the recording signal.

6. An apparatus according to claim 4, wherein a moving amount of said ink sheet is smaller than a moving amount of said recording medium.

7. A thermal recording method for recording an image on a recording medium, comprising the steps of:

transmitting recording information for a line to a thermal head, the thermal head having a number of heat-generating elements;

measuring for the line a driving ratio relative to the number of heat generating elements provided on said thermal head;

conveying said recording medium and a member supporting an ink layer by a predetermined amount;

recording by energizing said heat generating elements according to said recording information for the line;

determining a time interval between termination of recording for a preceding line and beginning a next recording for a next line in accordance with a next driving ratio corresponding to a next line which is measured at said measuring step; and starting the next recording after the time interval.

8. An apparatus according to claim 7, wherein in said determining step the time interval gradually increases as the driving ratio increases.

9. A driving device for driving a recording head having a plurality of heat generating elements to record a predetermined line and in response to a consecutive predetermined line, said device comprising:

discriminating means for discriminating recording information for a particular predetermined line to be recorded; and changing means for changing a non-driving time of said heat generating elements for the consecutive predetermined line in accordance with the recording information discriminated by said discriminating means.

* * * * *

UNITED STATES PATENT AND TRADEMARK OFFICE
CERTIFICATE OF CORRECTION

PATENT NO. : 5,144,329

DATED : September 1, 1992

INVENTOR(S) : Tomoyuki Takeda,et al

It is certified that error appears in the above-identified patent and that said Letters Patent is hereby corrected as shown below:

COLUMN 1

Line 10, "sheet," should read --sheet--.
Line 14, "covers," should read --covers--.
Line 15, "of" should be deleted.
Line 48, "image," should read --image--.
Line 49, "known" should read --known,-- and "sheet for" should read --sheet is used for--.
Line 57, "n times" should read --n times,--.

COLUMN 2

Line 10, "strains" should read --stains-- and "which" should be deleted.
Line 31, "the heat" should read --heat--.

COLUMN 4

Line 3, "modula-" shuold read --(modula- --.
Line 4, "tor-demodulator" should read --tor-demodulator)--.

COLUMN 5

Line 38, "fluctuation" should read --fluctuations in--.

COLUMN 6

Line 18, "data))," should read --data),--.

COLUMN 8

Line 66, "so" should be deleted.

UNITED STATES PATENT AND TRADEMARK OFFICE
CERTIFICATE OF CORRECTION

PATENT NO. : 5,144,329

DATED : September 1, 1992

INVENTOR(S) : Tomoyuki Takeda,et al

It is certified that error appears in the above-identified patent and that said Letters Patent is hereby corrected as shown below:

COLUMN 9

Line 23, "by software." should read --by other means such as software.--.
Line 55, "sheet 4." should read --sheet 14.--.

COLUMN 10

Line 45, "and" should be deleted.
Line 64, "etholocellulose" should read --ethylcellulose--.

COLUMN 11

Line 42, "carefully" should read --forcefully--.
Line 66, "exceed" should read --exceeds--.

Signed and Sealed this

Seventh Day of December, 1993

Attest:

BRUCE LEHMAN

*Attesting Officer* *Commissioner of Patents and Trademarks*